O. H. & A. F. PIEPER.
ELECTRIC CONTROLLING MECHANISM.
APPLICATION FILED OCT. 15, 1915.

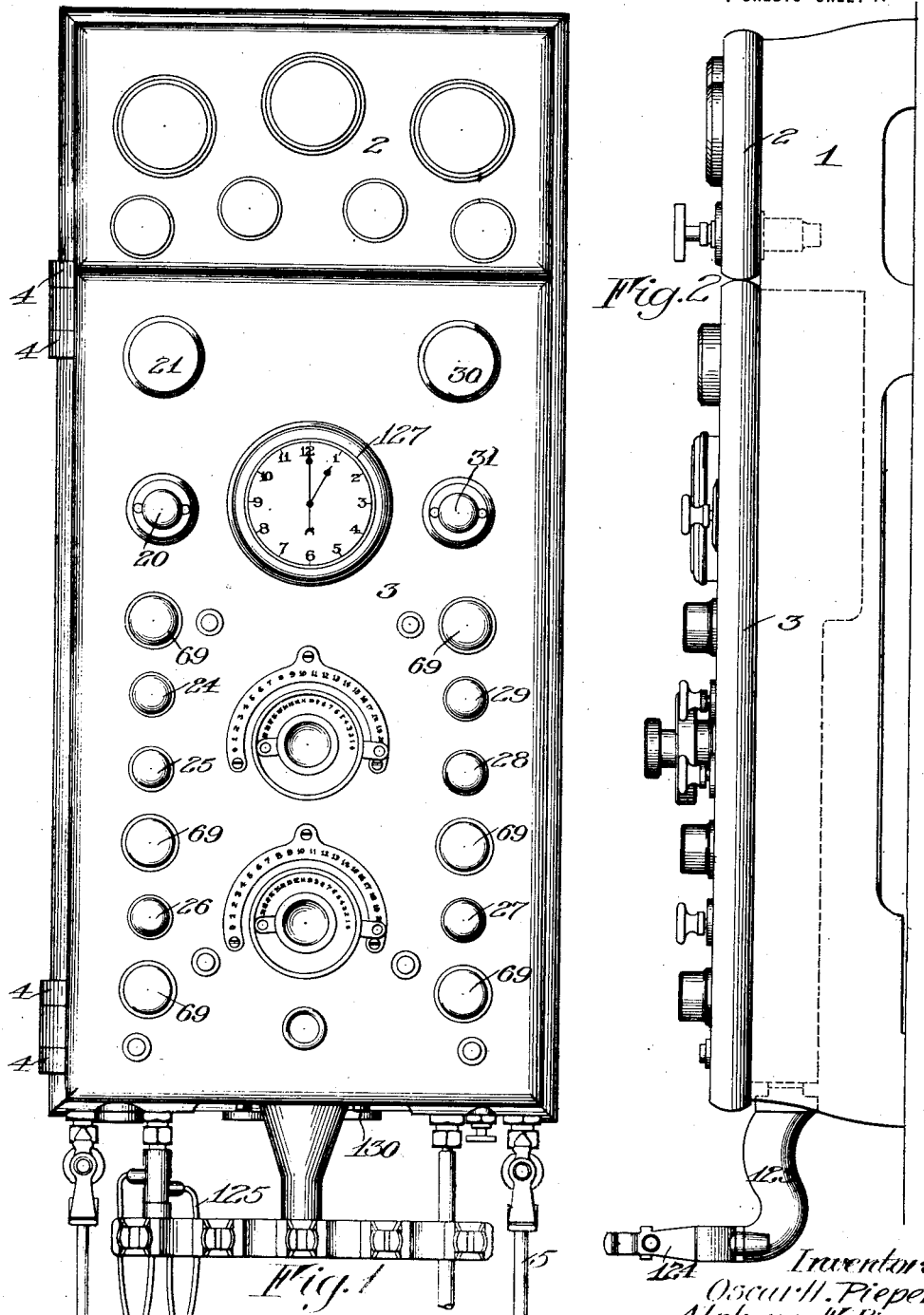
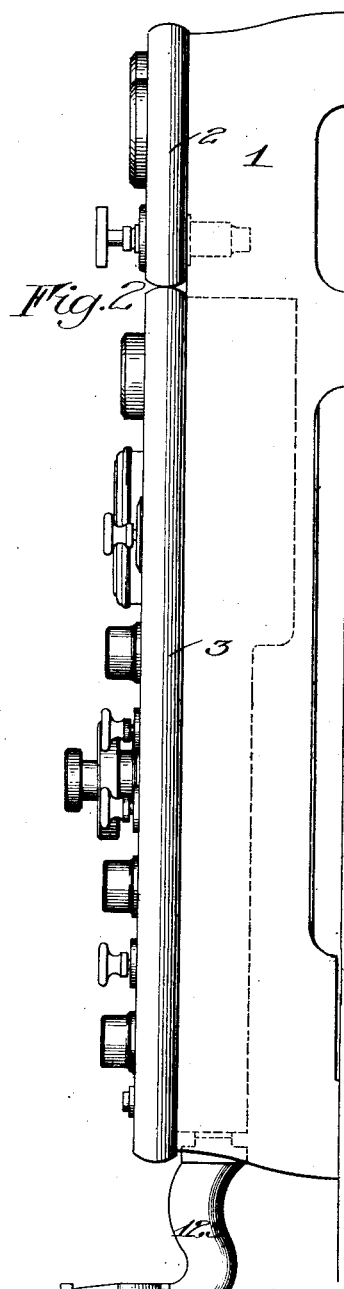

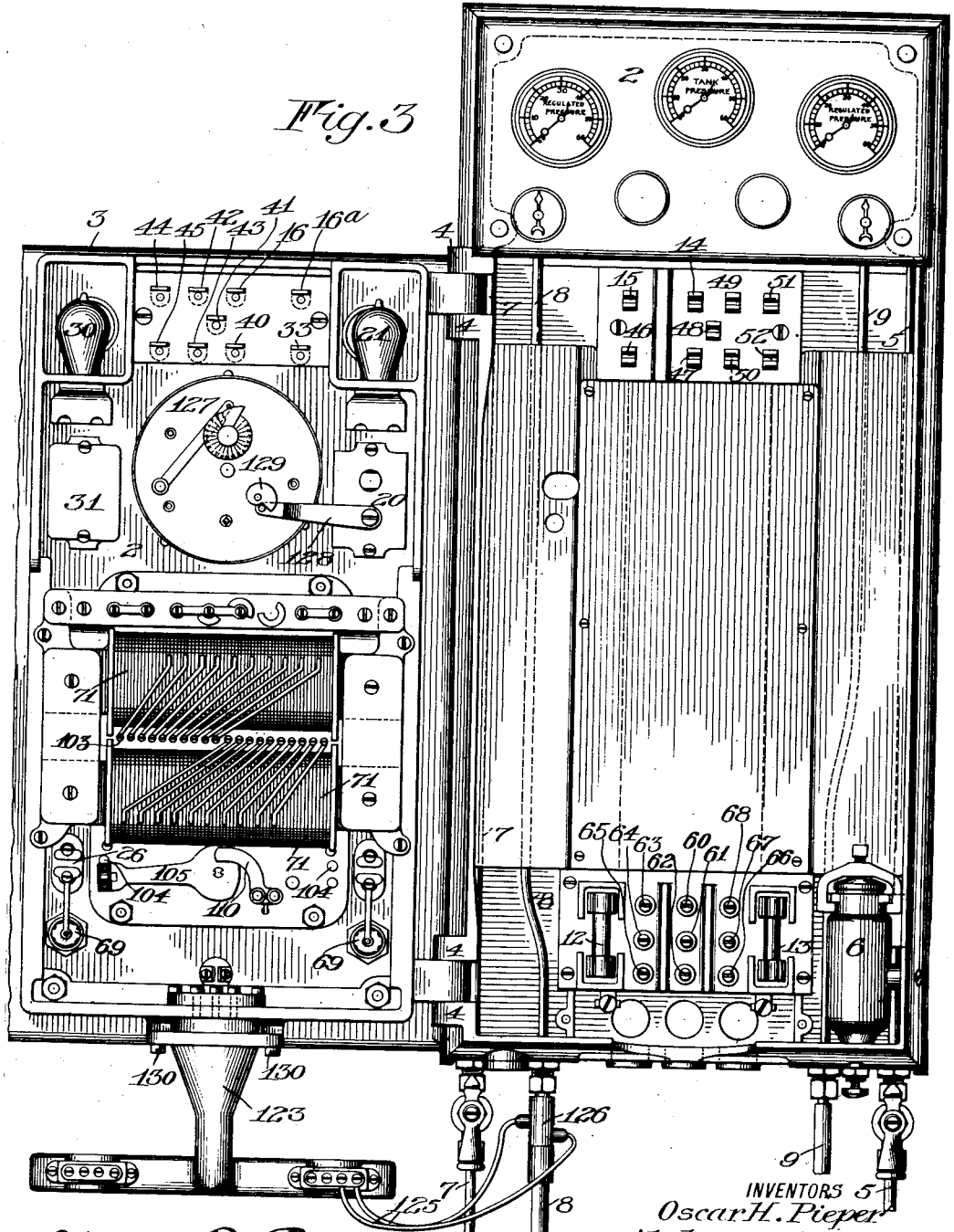

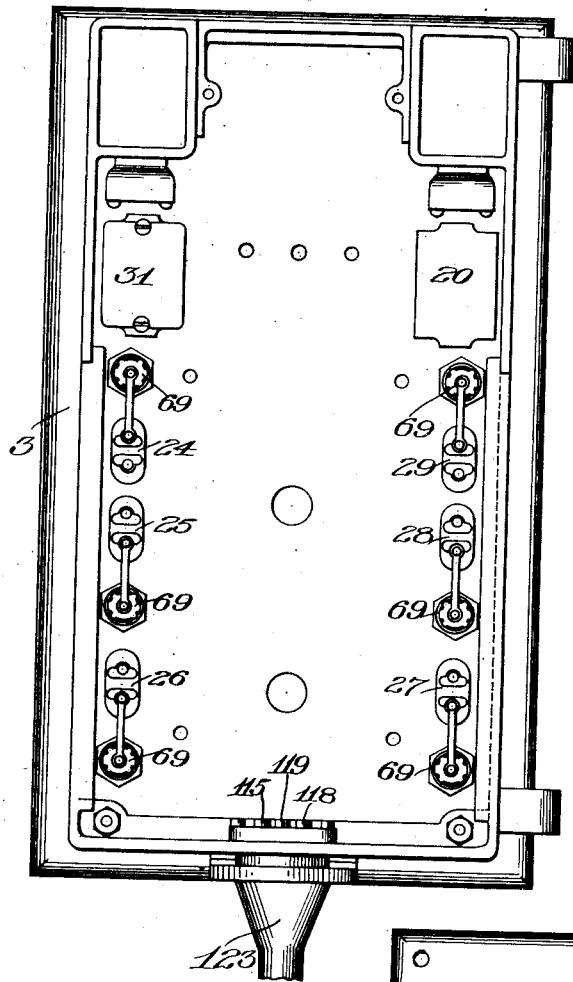
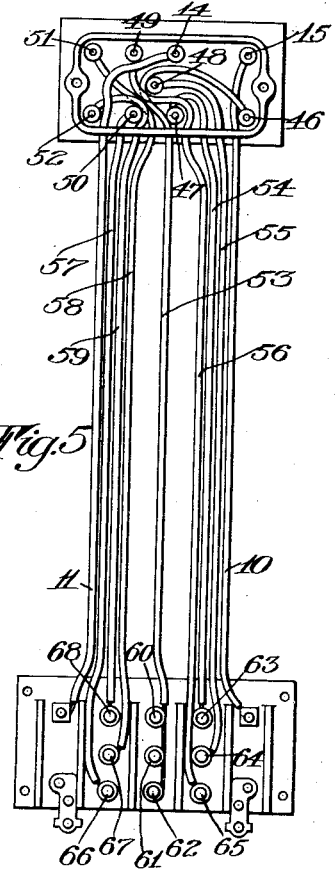
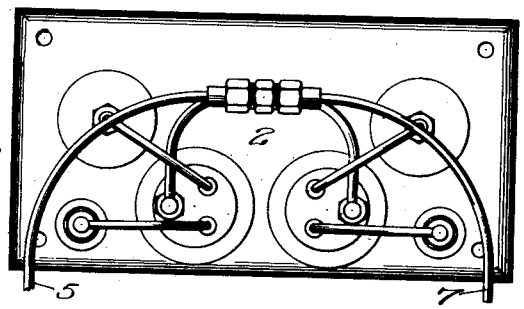

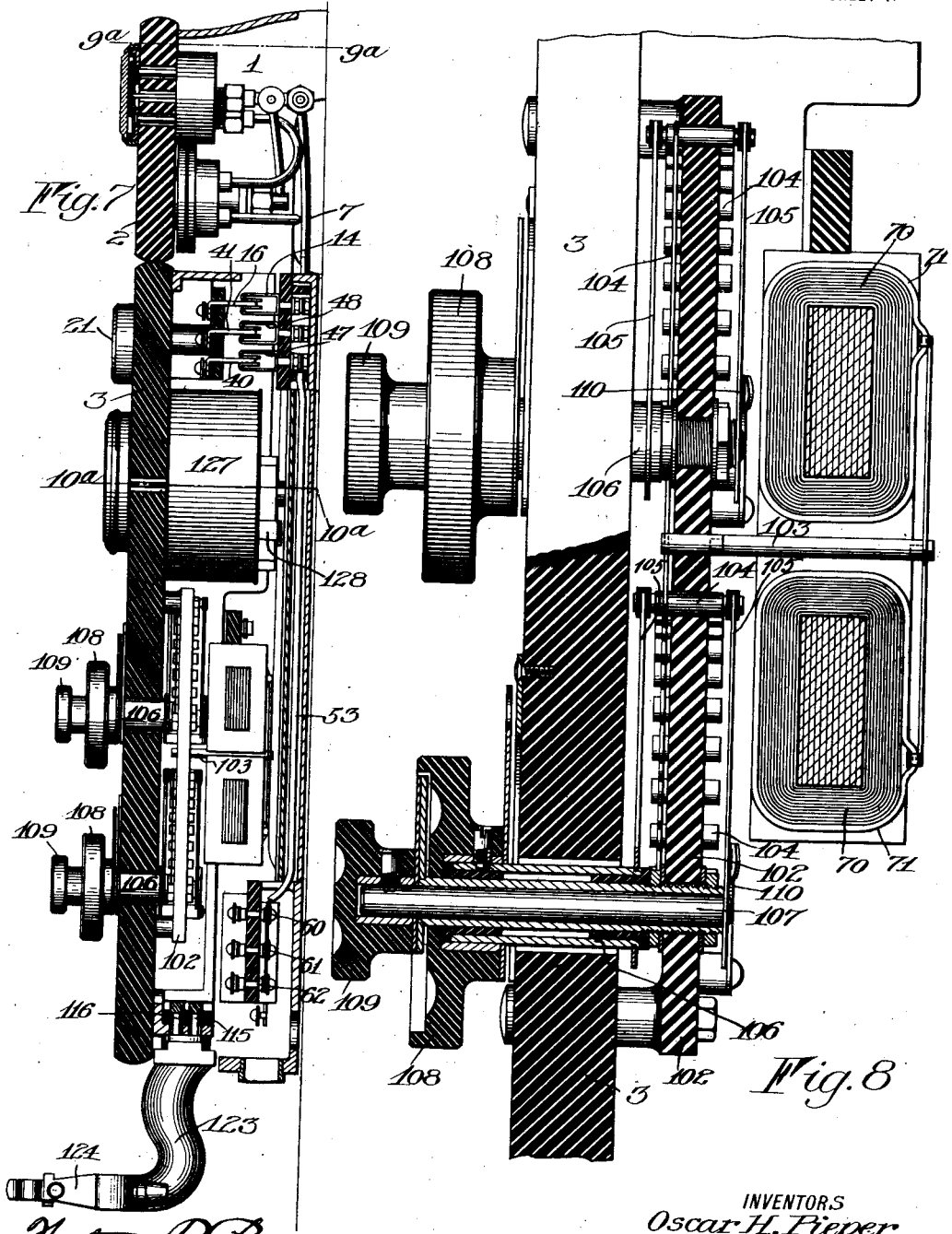

1,211,752.

Patented Jan. 9, 1917.
7 SHEETS—SHEET 5.

WITNESSES:
Walter B Payne
Nelson H. Copp

INVENTORS
Oscar H. Pieper
Alphonse F. Pieper
BY
Church Rich
their ATTORNEYS

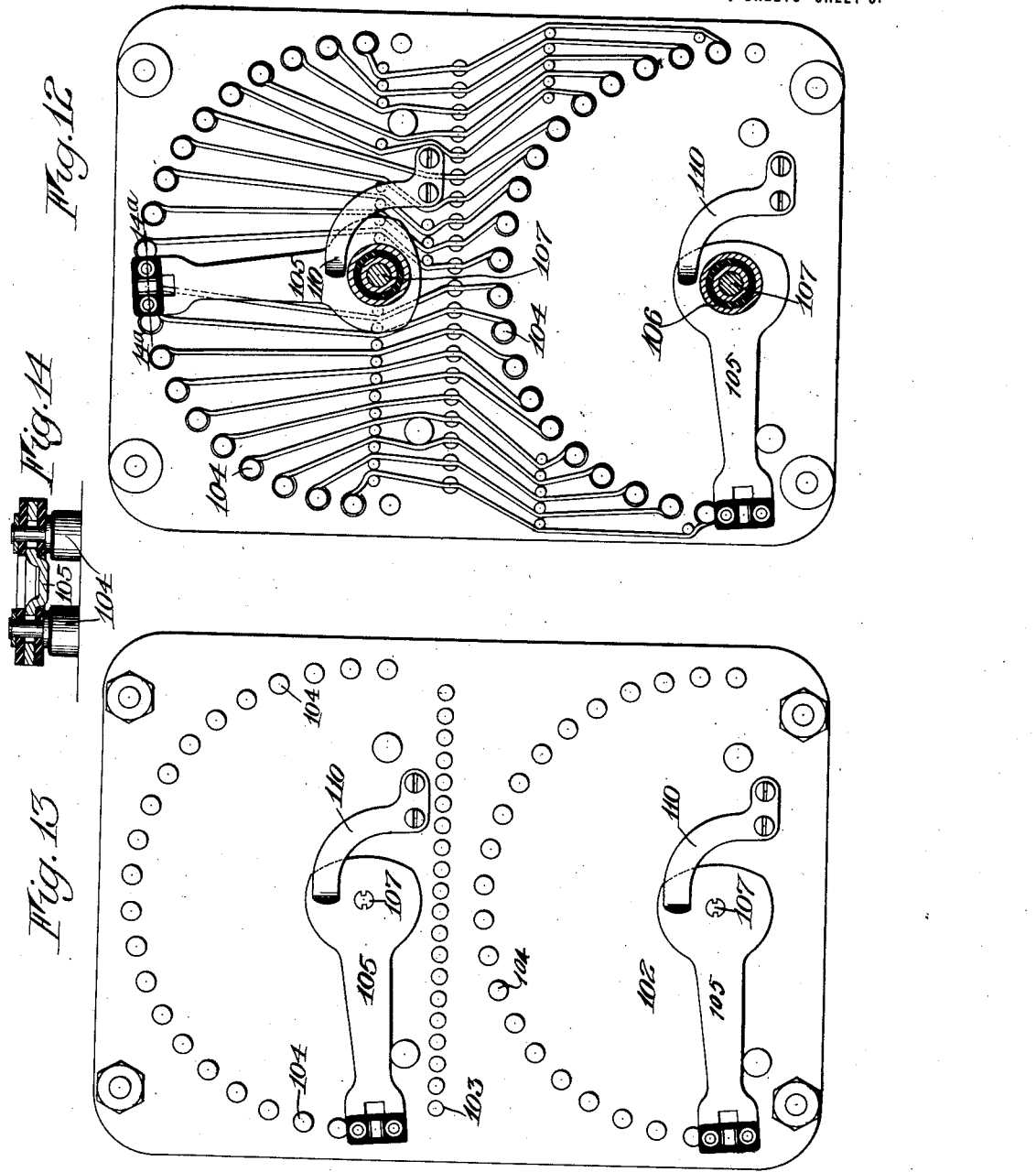

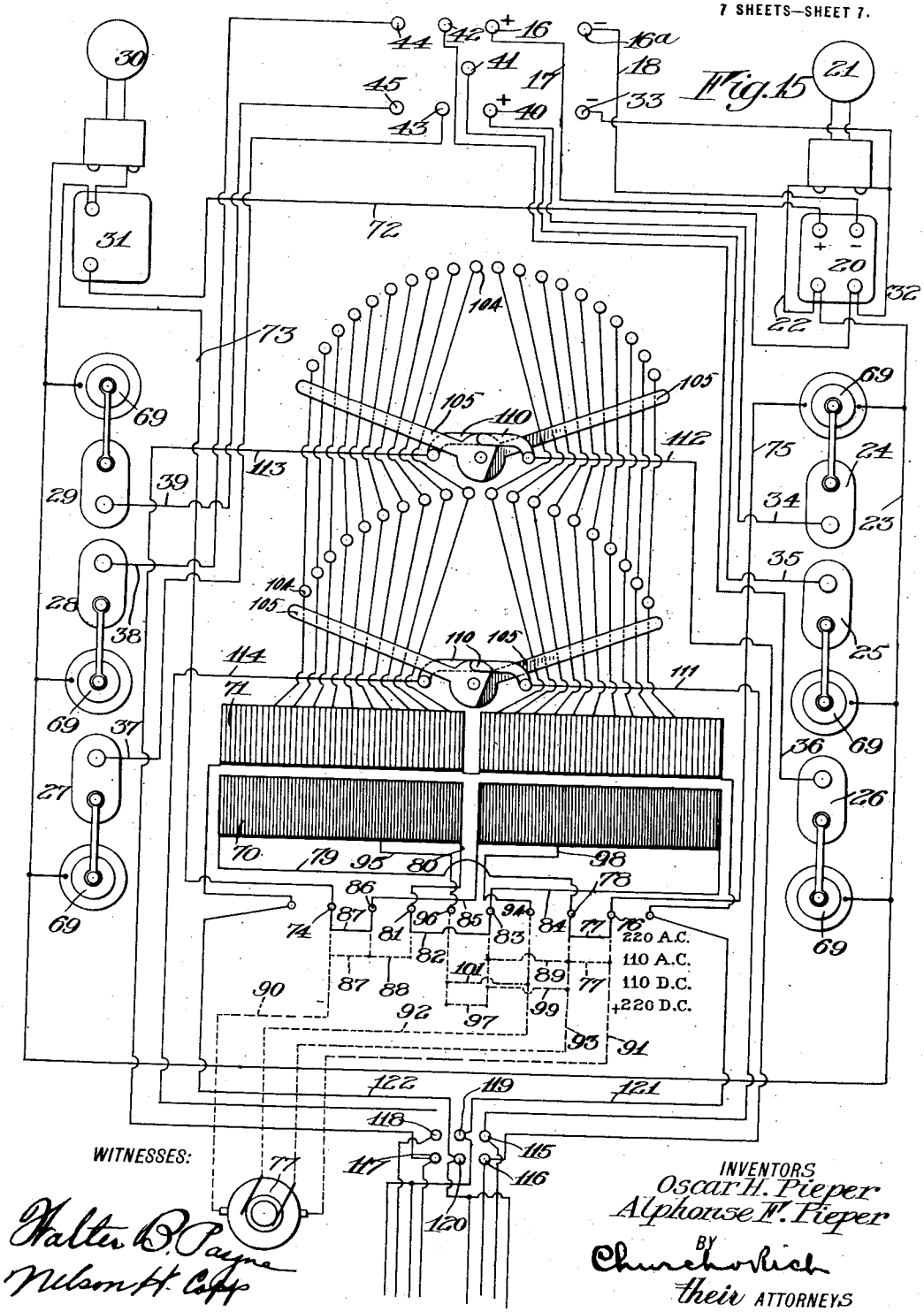

UNITED STATES PATENT OFFICE.

OSCAR H. PIEPER AND ALPHONSE F. PIEPER, OF ROCHESTER, NEW YORK.

ELECTRIC CONTROLLING MECHANISM.

1,211,752.      Specification of Letters Patent.      Patented Jan. 9, 1917.

Application filed October 15, 1915. Serial No. 56,122.

*To all whom it may concern:*

Be it known that we, OSCAR H. PIEPER and ALPHONSE F. PIEPER, both of Rochester, in the county of Monroe and State of New York, have invented certain new and useful Improvements in Electric Controlling Mechanisms; and we do hereby declare the following to be a full, clear, and exact description of the same, reference being had to the accompanying drawings, forming a part of this specification, and to the reference-numerals marked thereon.

Our invention has for its object to provide a structure for use primarily in connection with dental surgical work in order to enable a convenient and efficient control of the various machines and instruments employed in connection with work of this character.

With this in view, the invention contemplates a controlling mechanism in the form of a single unit, with facilities for independently regulating the operation of any of the different instruments or machines, of the general class indicated.

Considered from a more specific aspect, the invention comprises, in general, a casing or housing, and a movable closure mounted on the housing, and from which different low voltage instruments, such as lamps, cauteries and hot air syringes may be regulated and operated, the housing being also furnished with electrical connecting means for the usual high voltage instruments employed in this class of work.

One of the chief purposes of our improvement is to afford means for readily and accurately controlling each electrical circuit, from the outside of the closure when the latter is in closed position, and also for automatically opening all the circuits when the closure is opened to provide against any accident that might result from the operator coming in contact with any of the conductors that may be exposed.

To these and other ends the invention resides in certain improvements and combinations of parts all as will be hereinafter more fully described, the novel features being pointed out in the claims at the end of the specification.

Figure 9:
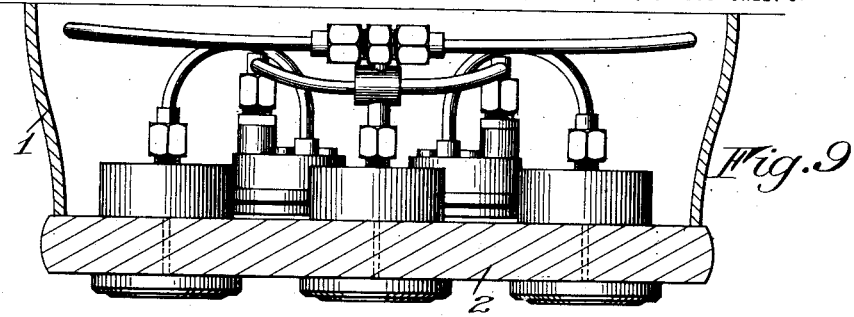
Figure 10:
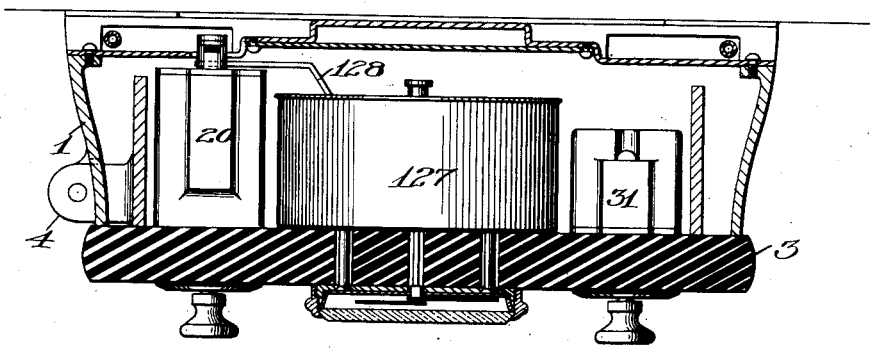
Figure 11:
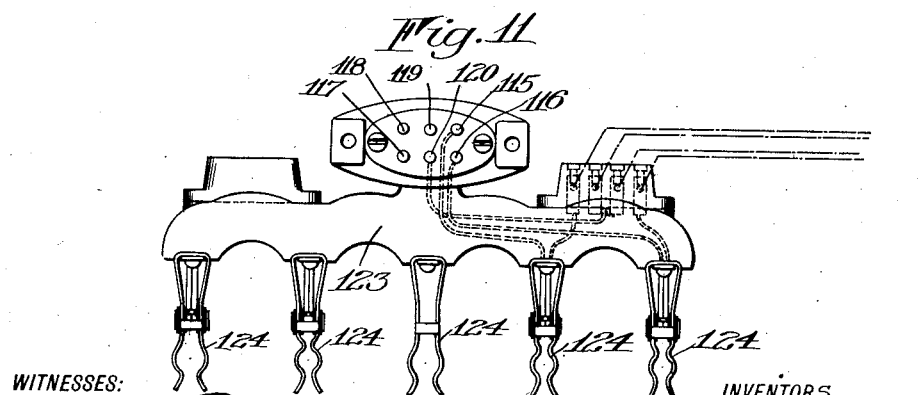

In the drawings: Figure 1 is a front elevation of an apparatus constructed in accordance with a preferred arrangement of the invention; Fig. 2 is a side view of the same; Fig. 3 is a view in elevation of the structure with the closure in open position; Fig. 4 is an elevation of the casing with the closure removed; Fig. 5 is a rear elevation, showing the arrangement of electrical conductors in the casing; Fig 6 is a plan view of the apparatus; Fig. 7 is a vertical sectional view with the closure in closed position; Fig. 8 is a sectional view enlarged, of a portion of Fig. 7; Fig. 9 is a horizontal sectional view taken on line 9ª 9ª of Fig. 7; Fig. 10 is a horizontal sectional view on line 10ª 10ª of Fig. 7; Fig. 11 is a plan view of the bracket for the instrument holders, which is attached to the lower part of the closure; Fig. 12 is a detail view in front elevation of the contact support for the regulating switches; Fig. 13 is a rear view of the same; Fig. 14 is an enlarged sectional view on line 14ª 14ª of Fig. 12, and Fig. 15 is a diagrammatic view showing the arrangement of circuits.

Similar reference characters in the several figures indicate the same parts.

The chief features of our invention may be carried out in several different ways, and the present embodiment which may be said to include a preferred arrangement, can be described generally as including a casing or housing to which leads the main electrical supply conductors. Coöperating with the casing is a hinged closure carrying a transformer supplied from the conducting means in the casing, and affording current for a series of low voltage circuits on the closure, which are arranged to control any one of the different low voltage instruments that may be supported on the closure when not in operation. The casing is provided with a number of high voltage connections deriving current from the main conductors through additional conductors on the closure, the arrangement being such that when the closure is opened, all of the circuits, both high and low voltage, are automatically opened, while at the same time each of the circuits may be independently regulated or controlled when the closure is in closed position by means accessible from the outside of the closure.

With this general understanding of the arrangement of parts, we will now proceed to describe, in greater detail, the specific elements of the mechanism, which includes the casing or housing 1, the upper part of which is closed by a front plate 2, while 3 designates a movable closure that is preferably hinged in bearings 4. The casing is also furnished with electrical conductors 10 and 11, to which the main supply current is furnished through fuses 12 and 13 respectively. The conductors 10 and 11 lead to contacts 15 and 14 respectively, as will appear from an inspection of Figs. 3 and 5, while 16 and 16ª designate switches which coöperate with the contacts 14 and 15 when the closure is in closed position and afford a continuous circuit to the conductors 17 and 18 on the closure.

Referring to Fig. 15, the conductors 17 and 18 lead to a main controlling switch, designated at 20, from which the positive current is conducted in multiple to a pilot lamp 21 through conductor 22, and through conductor 23 to the switches 24, 25, 26, 27, 28 and 29, thence through pilot lamp 30 and to the switch 31, which controls the low voltage or transformer circuits in a manner that will appear more clearly presently. From the switch 20, conductor 32 leads the negative side of the circuit to switch 33, while conductors 34, 35, 36, 37, 38 and 39 lead from the respective switches 24, 25, 26, 27, 28 and 29 to switches 40, 41, 42, 43, 44 and 45 respectively. The switches 33, 40, 41, 42, 43, 44 and 45 coöperate, when the closure is in closed position, with contacts 46, 47, 48, 49, 50, 51 and 52 respectively, which in turn are connected to the conductors 53, 54, 55, 56, 57, 58 and 59 respectively. The conductor 53 which is negative, leads to the common binding posts 60, 61 and 62, while the remaining conductors are connected with binding posts 63, 64, 65, 66, 67 and 68 respectively, whereby connection may be made between any one of the three common posts and the corresponding ones of the other six posts to establish any desired high voltage circuit for operating a high voltage instrument such as a fan, dental engine or the like. It is obvious that from what has been described, the main supply current passes through the casing and into the closure through a series of conductors, and thence back to the casing before being led off to the high voltage instruments, and by this arrangement, all of the circuits are automatically opened when the closure is opened; and in addition to this, it is possible to open or close each high voltage circuit independently of the others from its particular switch on the closure, or to open all of the high voltage circuits from the main controlling switch on the closure, while still affording a supply of current for the low voltage instruments as now to be described. Each high voltage circuit is provided with a fuse arranged in a fuse receptacle indicated diagrammatically by 69.

The low voltage instruments such as mouth lamps, cauteries and hot air syringes and miscellaneous attachments, are operated through a transformer on the closure, designated generally by the primary coil 70 and secondary coil 71, and to this end, conductor 72 leads from the negative side of the switch 20 to the negative side of switch 31, while conductor 73 leads from the switch 31 to contact point 74, and conductor 75 leads from switch 69 to contact point 76, from which points connections are made with the transformer directly for alternating current, and through a converter 77 for direct current in the particular manner that will now be set forth. In the case of 220 volt A. C., the current passes from point 76 through conductor 77, contact point 78 and conductor 79 to the left hand coil of the primary, as shown in Fig. 15, thence through conductor 80, contact point 81 and conductor 82, contact point 83 and conductor 84 to the right hand coil, from which it passes through conductor 85, contact point 86 and conductor 87 to the point 74 and the negative side of the line. In the case of the 110 volt A. C., the current divides in passing through the primary coils, one-half going from point 76 through conductors 77 and 79 to the left hand coil, thence through conductor 80, point 81 and conductor 88 to point 74, while the other half passes through conductor 89 to point 83, conductor 84 into the right hand coil, and thence through conductor 85 and point 86 to conductor 87 and point 74. Where direct current is supplied, it passes from the point 74 and 76 by way of conductors 90 and 91 to the converter 77 from which conductors 92 and 93 lead to the points 94 and 78 respectively. For 110 volt D. C., the path of travel of the current is from point 78 through conductor 79 to the left hand coil of the primary, thence through conductor 95 to point 96, through conductor 97 to point 83 and conductor 84 to the right hand coil of the primary, from which it passes through conductor 98 to point 94. In the case of 220 volt D. C., the current divides, one-half passing from conductor 93 through conductor 99 to point 83, conductor 84 into the right hand coil and back to conductor 92 through the conductor 98, while the other half of the current passes from conductor 93 through conductor 79 to the left hand coil, thence through conductor 95 and point 96 to conductor 101 and back to conductor 92. With this arrangement, the transformer which controls the low voltage instruments is operable from any of the currents which are ordinarily available, and it is now in order to describe, with particularity, the construction and arrangement of the transformer referred to and the low voltage circuits controlled thereby.

We have already designated the primary and secondary coils of the transformer which is mounted on the support or closure 3 which has already been mentioned, and for a clear understanding of which reference is to be had to Figs. 7 and 8. Also mounted on the support or closure 3 is a contact support or panel designated by 102 upon which are arranged upper and lower sets of contacts upon opposite sides of the support and connected with intermediate conducting posts 103, as shown clearly in Fig. 8, which in turn are connected with the windings of the secondary coils, as appears in Fig. 3. Coöperating with the contacts 104 on the contact support is a plurality of switches designated by 105 arranged in pairs, one above and one below, and engaging the contacts on opposite sides of the support in the manner indicated. The switches of each pair are mounted on operating members journaled in the closure and coaxially mounted one within the other for independent operation, two of the operating members being indicated by 106 and 107 respectively to which are secured the handles 108 and 109 in the manner shown in Fig. 8. The switches 105 are connected through wiping contacts 110 with conductors 111, 112, 113, and 114 respectively, which lead to connections 115, 116, 117 and 118 respectively, while the connections 119 and 120 are joined through conductors 121 and 122 with the secondary coil.

123 designates an instrument supporting bracket secured to the bottom of the closure and carrying a series of conductors leading from connections 115, 116, 117, 118, 119 and 120 to suitable instrument sockets arranged in the manner shown in Fig. 11. The conductors last mentioned lead through switches incorporated in the instrument holders 124, whereby each particular circuit is opened when the instrument is supported in its holder and not in operation. In the present embodiment, we have shown four holders for electrically controlled instruments, such as mouth lamps, cauteries, hot air syringes and other miscellaneous instruments, the circuits for the four instruments being completed through the points 115, 116, 117, 118, 119 and 120, as shown in Fig. 15. Conductors 125 lead from the bracket 123 to the connection 126 to afford a current for heating the air as it passes through said connection, as indicated generally in Fig. 3, and as the particular structure of the hot air syringe and its connection with the casing forms no part of the invention, as covered by the present application, it is unnecessary to describe it in any greater detail. By adjusting the switches 105, the low voltage circuits leading to the low voltage instruments can be regulated to increase or decrease the voltage, while all of the low voltage circuits can be opened independently of the high voltage circuits by operating the switch 31.

It is also desirable to provide means for automatically cutting off all current to the controlling mechanism at a predetermined instant, and with this in view, we employ a clock mechanism, designated generally by 127, which is arranged to control the main switch 20 through a lever 128 and a cam 129, the latter being released automatically at any desired time and operating the lever 128, according to any of the well known forms of construction for time controlled switches. The bracket 123 is preferably removably supported on the closure, and is held in place by set screws 130, while the conductors which lead to the several instruments are carried downwardly through a hollow portion of the bracket and outwardly to the sockets at the opposite ends thereof where the instruments are connected.

The invention provides an extremely convenient method of accomplishing the several results, combining into a single unit, devices that have heretofore required two or more different mechanisms, and the present arrangement is such that the available space is utilized to a maximum extent, and the different elements can be controlled with great readiness, while the simplicity of the construction is such as to obviate much likelihood of disarranging any of the parts or short circuiting or accidentally breaking any of the circuits, or in any other manner disorganizing the apparatus.

We claim as our invention:

1. In an electric controlling mechanism, the combination with a casing and a movable closure therefor, of a series of circuits including high voltage conductors arranged in the casing and connected with corresponding conductors on the closure, a series of low voltage conductors on the closure, and means acting to open the circuits when the closure is opened.

2. In an electric controlling mechanism, the combination with a casing and a movable closure therefor, of a series of circuits including high voltage conductors arranged in the casing and connected with corresponding conductors on the closure, a transformer carried by the closure, a series of low voltage conductors on the closure, and means acting to open the circuits when the closure is opened.

3. In an electric controlling mechanism, the combination with a casing and a movable closure therefor, of a transformer arranged on the closure, a series of circuits including low voltage conductors arranged on the closure, and means acting to open said circuits when the closure is opened.

4. In an electric controlling mechanism, the combination with a casing and a movable closure therefor, of a series of circuits including high voltage conductors arranged in the casing and connected with corresponding conductors on the closure, a transformer, a series of low voltage conductors on the closure and governed by said transformer, and means acting to open said circuits when the closure is opened.

5. In an electric controlling mechanism, the combination with a casing and a movable closure therefor, of a series of circuits including high voltage conductors arranged in the casing and connected with corresponding conductors on the closure, a series of low voltage conductors on the closure, and governing switches for each of said circuits located on the closure.

6. In an electric controlling mechanism, the combination with a casing and a movable closure therefor, of a series of circuits including high voltage conductors arranged in the casing and connected with corresponding conductors on the closure, a series of low voltage conductors on the closure, a governing switch for each of said circuits located on the closure, and means acting to open the several circuits when the closure is opened.

7. In an electric controlling mechanism, the combination with a casing and a movable closure therefor, of a series of circuits including high voltage conductors arranged in the casing and connected to corresponding conductors on the closure, a transformer located on the closure, and a series of low voltage conductors on the closure controlled by said transformer.

8. In an electric controlling mechanism, the combination with a casing and a closure therefor, of a series of circuits including high voltage conductors arranged in the casing and connected to corresponding conductors on the closure, a transformer located on the closure, a transformer regulator arranged on the closure, and a series of low voltage conductors on the closure controlled by said transformer.

9. In an electric controlling mechanism, the combination with a casing and a closure therefor, of a series of circuits including high voltage conductors arranged in the casing and connected to corresponding conductors on the closure, a transformer on the closure, a transformer regulator located on the closure, a series of low voltage conductors disposed on the closure, and a governing switch for each of the low voltage circuits also arranged on the closure.

10. In an electric controlling mechanism, the combination with a casing and a closure therefor, of a series of circuits including high voltage conductors on the closure, a transformer on the closure, a transformer regulator arranged on the closure, a series of low voltage conductors located on the closure, a governing switch for each of the low voltage circuits also arranged on the closure, and means acting to open the several circuits when the closure is opened.

11. In an electric controlling mechanism, the combination with a contact support, of a transformer located at one side of said contact support, a series of circuits controlled by said transformer, contacts on opposite sides of the contact support and connected with the transformer, and regulating switches movable on opposite sides of the contact support in engagement with the contacts.

12. In an electric controlling mechanism, the combination with a supporting member, of a transformer mounted thereon, a contact support carried by the supporting member and disposed in spaced relation to the same, contacts arranged on opposite sides of the contact support and connected with the transformer, and regulating switches mounted on the supporting member and coöperating with the contacts on opposite sides of the contact support.

13. In an electric controlling mechanism, the combination with a supporting member, of a transformer mounted thereon, a contact support carried by the supporting member and disposed in spaced relation to the same, contacts arranged on opposite sides of the contact support and connected with the transformer, and regulating switches coaxially mounted on the supporting member and coöperating with the contacts on opposite sides of the contact support.

14. In an electric controlling mechanism, the combination with a supporting member, of a transformer mounted thereon, a contact support carried by the supporting member and disposed in spaced relation to the same, contacts arranged on the contact support and connected with the transformer, independent regulating switches, each coöperating with certain of said contacts, and operating members for the switches journaled one within the other on said supporting member.

15. In an electric controlling mechanism, the combination with a supporting member, of a transformer mounted thereon, a contact support carried by the supporting member and disposed in spaced relation to the same, contacts arranged on opposite sides of the contact support and connected with the transformer, regulating switches mounted on the supporting member and coöperating with the contacts on opposite sides of the contact support, and operating members for the switches journaled one within the other on the supporting member and actuating the switches on opposite sides of the contact support.

16. In an electric controlling mechanism, the combination with a supporting member and a transformer mounted thereon, of a contact support arranged in spaced relation to the supporting member and carrying upper and lower sets of contacts, conducting posts disposed between the upper and lower sets of contacts and connecting the contacts with the windings of said transformer, and independent switches, each coöperating with one of said series of contacts.

17. In an electric controlling mechanism, the combination with a supporting member and a transformer mounted thereon, of a contact support arranged in spaced relation to the supporting member and carrying upper and lower sets of contacts on opposite sides of the contact support, conducting posts disposed between the upper and lower sets of contacts and connecting them with the windings of said transformer, and independent switches on opposite sides of the contact support, each coöperating with one of said series of contacts.

18. In an electric controlling mechanism, the combination with a supporting member and a transformer mounted thereon, of a contact support arranged in spaced relation to the supporting member and carrying upper and lower sets of contacts on opposite sides of the contact support, conducting posts disposed between the upper and lower sets of contacts and connecting the contacts with the windings of said transformer, and switches coaxially mounted and coöperating with said contacts on opposite sides of the contact support.

19. In an electric controlling mechanism, the combination with a supporting member and a transformer mounted thereon, of a contact support arranged in spaced relation to the supporting member and carrying upper and lower sets of contacts on opposite sides of the contact support, conducting posts disposed between the upper and lower sets of contacts and connecting the contacts with the windings of said transformer, switches arranged on opposite sides of the contact support, each coöperating with one of the sets of contacts, and operating members for the switches journaled one within the other on the supporting member.

20. In an electric controlling mechanism, the combination with a casing and a closure therefor, of a series of circuits including high voltage conductors on the casing, a series of low voltage conductors on the closure, connections whereby high and low voltage instruments may be operated from said conductors on the casing and closure respectively, and means acting to open all of the circuits when the closure is opened.

21. In an electric controlling mechanism, the combination with a casing and a closure, of main conductors leading to the casing and thence to the closure when the latter is closed, high voltage conductors on the casing deriving current from said conductors on the closure, low voltage conductors on the closure deriving current through a transformer, connections whereby high and low voltage instruments may be operated from the conductors on the casing and closure respectively, and means acting to open all the circuits when said closure is opened.

22. In an electric controlling mechanism, the combination with a casing and a closure, of main conductors leading to the casing and thence to the closure when the latter is closed, high voltage conductors on the casing deriving current from said conductors on the closure, low voltage conductors on the closure deriving current through a transformer, switches located on the closure and each controlling one of said circuits, connections whereby high and low voltage instruments may be operated from the conductors on the casing and closure respectively, and means acting to open all the circuits when the closure is opened.

OSCAR H. PIEPER.

Witnesses:
R. M. WRIGHT,
E. O. PIEFER.

ALPHONSE F. PIEPER.

Witnesses:
V. R. HUMPHREYS,
R. V. STEWART.